(12) United States Patent
Yanaka et al.

(10) Patent No.: US 11,366,448 B2
(45) Date of Patent: Jun. 21, 2022

(54) SPATIAL ACCURACY CORRECTION METHOD AND APPARATUS

(71) Applicant: MITUTOYO CORPORATION, Kanagawa (JP)

(72) Inventors: Shinichiro Yanaka, Ibaraki (JP); Masayuki Nara, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 860 days.

(21) Appl. No.: 16/219,033

(22) Filed: Dec. 13, 2018

(65) Prior Publication Data
US 2019/0187661 A1    Jun. 20, 2019

(30) Foreign Application Priority Data

Dec. 14, 2017 (JP) .............................. JP2017-240066

(51) Int. Cl.
*G05B 19/401* (2006.01)
*G01B 9/02055* (2022.01)
*G06F 17/12* (2006.01)

(52) U.S. Cl.
CPC ....... *G05B 19/401* (2013.01); *G01B 9/02055* (2013.01); *G01B 9/02071* (2013.01);
(Continued)

(58) Field of Classification Search
None
See application file for complete search history.

(56) References Cited

U.S. PATENT DOCUMENTS 8,452,564 B2 * 5/2013 Balsamo .............. G01B 21/042
73/1.79
9,746,303 B2 * 8/2017 Nakagawa ............. G01B 5/008
(Continued)

FOREIGN PATENT DOCUMENTS

DE     102007004934 A1    7/2008
WO     WO93/08449 A1      4/1993

OTHER PUBLICATIONS

U.S. Appl. No. 16/218,902 to Shinichiro Yanaka et al., which was filed Dec. 13, 2018.
(Continued)

*Primary Examiner* — Christopher W Fulton
(74) *Attorney, Agent, or Firm* — Greenblum & Bernstein, P.L.C.

(57) ABSTRACT

A method that corrects an error in positioning in a positioning mechanism by using a measurable length value measured by a laser interferometer and a measured value for spatial coordinates measured by the positioning mechanism. The method includes a measurement step in which a retroreflector affixed to a displacer is displaced to a plurality of measurement points, and the measured length value and the measured value at each of the measurement points is acquired; and a parameter calculation step in which a correction parameter is calculated based on the measured value, the measured length value, and the coordinates of a rotation center of the tracking-type laser interferometer. A first correction constant is applied to the measured length value for each measurement line, and a second correction constant different from the first correction constant is applied to the coordinates of the rotation center of the interferometer for each measurement line.

2 Claims, 4 Drawing Sheets

(52) U.S. Cl.
CPC ......... *G01B 9/02072* (2013.04); *G06F 17/12* (2013.01); *G05B 2219/37193* (2013.01); *G05B 2219/39033* (2013.01); *G05B 2219/50057* (2013.01)

(56) References Cited

U.S. PATENT DOCUMENTS

| | | | |
|---|---|---|---|
| 10,162,041 B2* | 12/2018 | Taketomi | G01B 21/04 |
| 10,557,941 B2* | 2/2020 | Yanaka | G01B 11/002 |
| 2018/0058832 A1 | 3/2018 | Nakagawa et al. | |
| 2018/0058847 A1 | 3/2018 | Nakagawa et al. | |
| 2019/0187660 A1* | 6/2019 | Yanaka | G01B 9/02071 |

OTHER PUBLICATIONS

Office Action issued in China Counterpart Patent Appl. No. 201811532330.X, dated Jun. 23, 2021, along with an English translation thereof.
Umetsu, Kenta et al., "Geometric Calibration of a Coordinate Measuring Machine Using a Laser Tracking System", Measurement Science and Technology, vol. 16, Issue 12, Nov. 9, 2005, pp. 2466-2472.

\* cited by examiner

RELATED ART

SPATIAL ACCURACY CORRECTION METHOD AND APPARATUS

CROSS-REFERENCE TO RELATED APPLICATIONS

The present application claims priority under 35 U.S.C. § 119 of Japanese Application No. 2017-240066, filed on Dec. 14, 2017, the disclosure of which is expressly incorporated by reference herein in its entirety.

BACKGROUND OF THE INVENTION

1. Field of the Invention

The present invention relates to a spatial accuracy correction method and apparatus that correct an error in positioning in a positioning mechanism that positions a displacement body at a predetermined set of spatial coordinates.

2. Description of Related Art

Conventionally, a positioning mechanism is known that positions (displaces) a displacement body at a predetermined coordinate position in space (spatial coordinates). Examples of such positioning mechanisms may include a coordinate measuring machine (CMM) that displaces a measurement probe to measure a shape of an object, a machine tool that displaces a processing tool to process an object, a robot that displaces an arm to a predetermined position, and the like.

In a positioning mechanism of this kind, a displacement body must be positioned accurately at a predetermined set of spatial coordinates, and in order to achieve this, spatial accuracy methods have been proposed in which, for each axis in a positioning mechanism, translational error, rotational error, and squareness error between axes is corrected appropriately, and errors in positioning are reduced (see, for example, Umetsu et al. (2005) and the specification of German Patent No. 102007004934). The method described in Umetsu et al. performs spatial accuracy correction with a multilateration method, using a tracking-type laser interferometer. In addition, the method described in German Patent No. 102007004934 changes a position of a retroreflector attached to a tip of a Z spindle of a CMM to four or more locations, and measures the positions of the retroreflector in each location using the CMM. Also, simultaneously with this, a change in a distance to the retroreflector is measured by a tracking-type laser interferometer that is within a measurement range of the CMM or positioned in the vicinity thereof. Then, based on these measured values, a position of a rotation center of the tracking-type laser interferometer and an absolute distance from the rotation center of the tracking-type laser interferometer to the retroreflector are calculated with the multilateration method.

Figure 4:
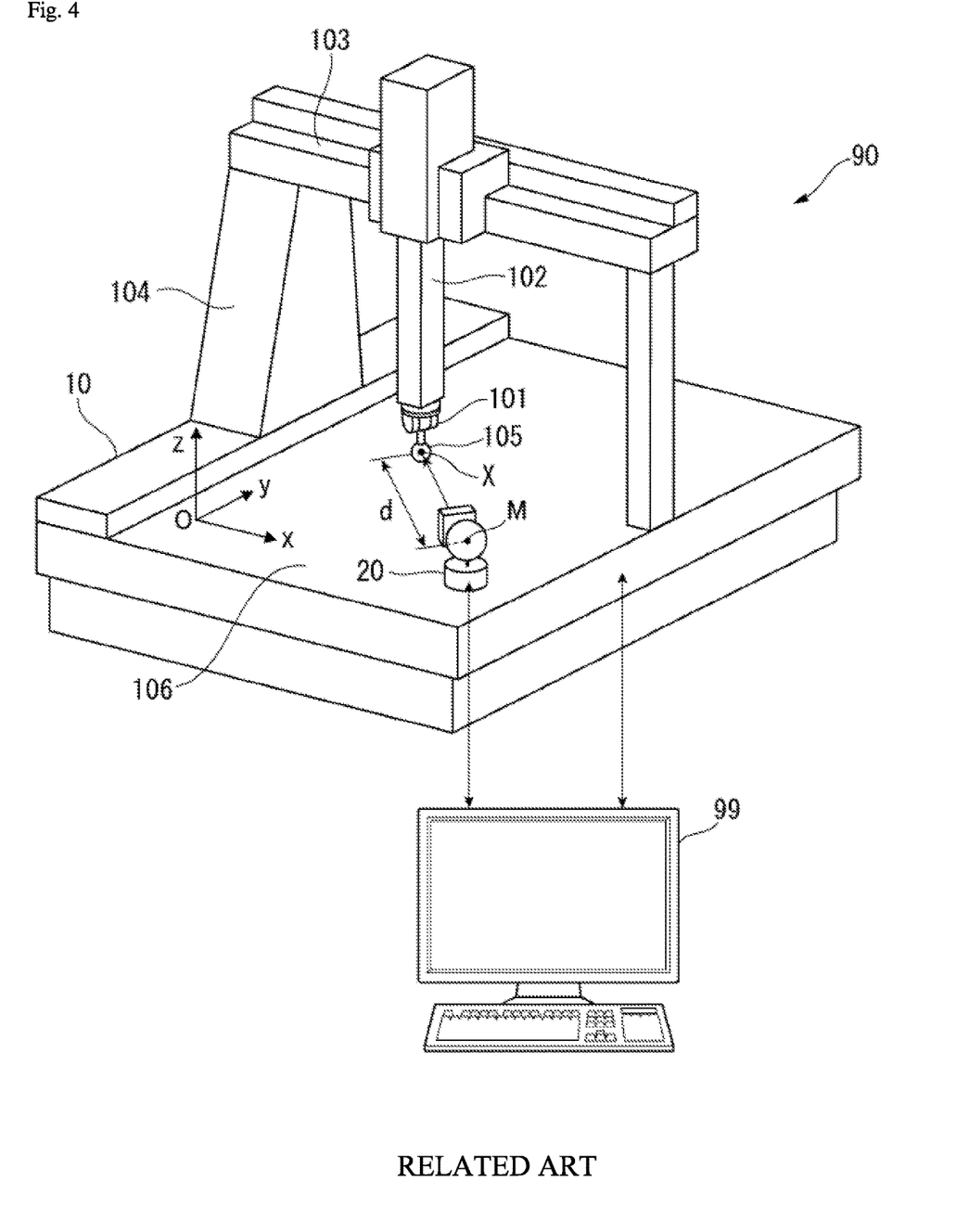
FIG. 4 illustrates a schematic configuration of a conventional spatial accuracy correction apparatus.

Here, a spatial accuracy correction method of a conventional positioning mechanism is described concretely. FIG. 4 illustrates a spatial accuracy correction apparatus that carries out the spatial accuracy correction method of the positioning mechanism (in this example, a CMM 10 is described). In FIG. 4, a spatial accuracy correction apparatus 90 uses a CMM 10, a tracking-type laser interferometer 20, and a PC 99. The spatial accuracy of the CMM 10 is to be corrected.

The CMM 10 includes a Z spindle 102 to which a measurement probe 101 is affixed, an X guide 103 holding the Z spindle 102 so as to be capable of displacement in an X direction, and a column 104 to which the X guide 103 is affixed and which is capable of displacement in a Y direction. Also, although not shown in the drawings, the CMM 10 further includes, for example, a Y displacement mechanism displacing the column 104 in the Y direction, an X displacement mechanism displacing the Z spindle 102 over the X guide 103 in the X direction, a Z displacement mechanism displacing the Z spindle 102 in a Z direction, and various scales which measure the spatial coordinates of the measurement probe 101 and the Z spindle 102 based on an amount of displacement of each displacement mechanism, for example. A retroreflector 105 is also installed at a tip of the measurement probe 101. The measurement probe 101 may also be detached and the retroreflector 105 mounted to a tip position of the Z spindle 102.

The tracking-type laser interferometer 20 is installed within a measurement range of the CMM 10, or in the vicinity thereof. The tracking-type laser interferometer 20 tracks the retroreflector 105 and measures a distance from a rotation center M of the tracking-type laser interferometer 20 to the retroreflector 105.

The PC 99 is a computer connected to the CMM 10 and the tracking-type laser interferometer 20. The PC 99 controls the CMM 10 and the tracking-type laser interferometer 20, and simultaneously performs coordinate measurement with the CMM 10 and length measurement with the tracking-type laser interferometer 20.

In this example, the tracking-type laser interferometer 20 normally cannot measure an absolute distance. Accordingly, using the method described in German Patent No. 102007004934, a position M of a rotation center of a tracking-type laser interferometer (hereafter abbreviated as a rotation center M) and an absolute distance from the rotation center M to the retroreflector 105 are calculated with the multilateration method. Then, a measured length value d acquired by the tracking-type laser interferometer 20 is preset such that the measured length value d indicates the absolute distance from the rotation center M to the retroreflector 105. However, coordinates $(x_m, y_m, z_m)$ of the rotation center M that are calculated at this point and a preset value of the measured length value d acquired by the tracking-type laser interferometer 20 are values found with the accuracy of the CMM 10 prior to correction and are not very accurate values. Therefore, when a spatial accuracy correction parameter Bα (hereafter abbreviated as a correction parameter Bα) for the CMM 10 is calculated, correction constants can be respectively applied to each value as an unknown quantity, and the optimal solution for the correction constants can be calculated together with the correction parameter Bα.

After the presetting described above, the position of the retroreflector 105 (hereafter referred to as a measurement point X) is modified and a plurality of the measurement points X are measured. Then, after that, a stylus offset (relative position of the retroreflector 105 with respect to the tip of the Z spindle 102 of the CMM 10) and the position of the rotation center M of the tracking-type laser interferometer (installation position of the tracking-type laser interferometer 20) are modified, and a plurality of measurement points X (a total of several thousand points) are measured. After the position of the rotation center M is modified, and after the stylus offset is modified, the coordinates of the rotation center M and the preset value of the measured length value d change, and therefore presetting is performed again. Therefore, a different value is applied to the position of the rotation center M $(x_m, y_m, z_m)$ and the preset value of the measured length value d each time the position of the rotation center M changes, and each time the stylus offset changes.

In the measurement of the measurement point X, a measured value $X_{CMM}$ ($x_{CMM}$, $y_{CMM}$, $z_{CMM}$) of the measurement point X acquired by the CMM 10 and the measured length value d acquired by the tracking-type laser interferometer 20 are measured simultaneously. Also, because the multilateration method is used, the rotation center M of the tracking-type laser interferometer 20 changes to and is measured at at least four different positions. Then, after the measurement of all measurement points X has ended, a correction parameter of the CMM 10 is calculated from the measured data ($X_{CMM}$, d). In the calculation of the correction parameter, the measured data measured at the several thousand measurement points X is substituted into Expressions (1) and (2) below, simultaneous equations for the several thousand Expressions (1) and (2) are prepared, and the correction parameter Bα of the CMM 10 is found by solving the equations using the least square method, as in Umetsu et al., for example.

[Formula 1]

$$\delta p \equiv [\delta x \; \delta y \; \delta z]^T = HB\alpha \tag{1}$$

$$\sqrt{\{(x_{CMM} + \delta x) - (x_m + f_{xm})\}^2 + \{(y_{CMM} + \delta y) - (y_m + f_{ym})\}^2 + \{(z_{CMM} + \delta z) - (z_m + f_{zm})\}^2} = \tag{2}$$

$$(d + F_d)$$

In Expression (1), $\delta p$ ($\delta x$, $\delta y$, $\delta z)^T$ is a matrix of an error in the measured values $X_{CMM}$ acquired by the CMM 10 at each measurement point X, and specifically is an error between the actual position of the retroreflector 105 and the measured value $X_{CMM}$. The superscript character "T" represents a transposed matrix. Bα is a matrix of correction parameters for the CMM 10 expressed by a B-spline function, B is a matrix of basis functions of B-spline functions, and a is a matrix of coefficients for the basis functions. H is a matrix converting the correction parameter Bα to an error δp of the measured value $X_{CMM}$, and is a known matrix configured from a mechanical structure and stylus offset information for the CMM 10 to be corrected. Also, the left and right sides of Expression (2) express, respectively, the measured value $X_{CMM}$ for the CMM 10 and the distance from the rotation center M to the retroreflector 105, which is expressed by the measured length value d of the tracking-type laser interferometer 20. As noted in the above description, $x_m$, $y_m$, and $z_m$ are respectively x, y, and z components of the coordinates of the rotation center M measured in the presetting. $F_d$ is a correction constant for the preset value of the measured length value d (hereafter referred to as a first correction constant $F_d$), and $f_{xm}$, $f_{ym}$, and $f_{zm}$ are respectively x, y, and z components of a correction constant $F_m$ for the coordinates of the rotation center M (hereafter referred to as a second correction constant $F_m$). The first correction constant $F_d$ and the second correction constant $F_m$ are both unknown quantities, and a different correction constant is applied each time the position of the rotation center M of the tracking-type laser interferometer is changed and each time the stylus offset is changed. These correction constants can be found, together with the correction parameter Bα, when solving the simultaneous equations of Expressions (1) and (2). The spatial accuracy of the CMM 10 to be corrected can be corrected using the correction parameter Bα, which is found as described above.

Non-Patent Literature

Umetsu, Kenta and Ryosyu Furutnani, Sonko Osawa, Toshiyuki Takatsuji, and Tomizo Kurosawa. "Geometric calibration of a coordinate measuring machine using a laser tracking system." *Measurement Science and Technology* 16.12 (2005): 2466-2472.

In a spatial accuracy correction method such as that described above, the tracking-type laser interferometer 20 measures length with the rotation center M as a reference point. However, when the position of the rotation center M becomes offset with respect to a coordinate origin point of the CMM 10 due to temperature drift or an external impact, for example, an error due to the positional offset of the rotation center M may be incorporated into the measured length value d of the tracking-type laser interferometer 20. In such a case, the effects of the positional offset of the rotation center M applied to the measured length value d cannot be inhibited by the methods of German Patent No. 102007004934 or Umetsu et al., described above. Accordingly, spatial accuracy correction is performed with the error included, which presents an issue of being unable to conduct a high-accuracy correction process.

SUMMARY OF THE INVENTION

The present invention provides a spatial accuracy correction method and apparatus having a high degree of correction accuracy.

A spatial accuracy correction method according to the present invention is a method that includes a positioning mechanism displacing a displacement body to a predetermined set of spatial coordinates, the positioning mechanism also having a retroreflector mounted to the displacement body, and a laser interferometer having a reference point and measuring a distance from the reference point to the retroreflector, the method performing spatial accuracy correction of the positioning mechanism using a measured length value measured by the laser interferometer and a measured value for spatial coordinates of the retroreflector measured by the positioning mechanism. The method includes a measurement step in which a plurality of measurement points are divided into a plurality of measurement lines, the displacement body is displaced to the plurality of measurement points, and the measured length value and the measured value at each of the measurement points is acquired for each measurement line; and a parameter calculation step in which a correction parameter is calculated based on the measured value, the measured length value, and the coordinates of the reference point. In the parameter calculation step, a first correction constant is applied to the measured length value for each measurement line, and a second correction constant different from the first correction constant is applied to the coordinates of the reference point for each measurement line to calculate the correction parameter.

In the conventional spatial accuracy correction method of a positioning mechanism, each time coordinates of a reference point of a laser interferometer (hereafter, may also be referred to as reference point coordinates) and a stylus offset change, respectively different first and second correction constants are applied and a correction parameter is calculated.

In contrast, in the present invention, when the plurality of measurement points are measured, the plurality of measurement points are divided into a plurality of measurement lines and each measurement line is measured in order. Then, a first correction constant that is respectively different for each measurement line is applied to the measured length value, and a second correction constant that is respectively different for each measurement line is applied to the reference point coordinates and the correction parameter is calculated each time the reference point coordinates and the stylus offset are changed, and also for each measurement line.

In the present invention having this configuration, the first correction constant and the second correction constant, which are respectively different for each measurement line, are applied and therefore, even in a case where the offset of the reference point coordinates gradually increases during measurement due to a temperature drift, for example, by correcting the positional offset of the reference point coordinates and the measured length value for each measurement line, incorporation of an error in the measured length value can be inhibited, and a highly accurate correction parameter can be calculated.

A spatial accuracy correction apparatus according to the present invention includes a positioning mechanism displacing a displacement body to a predetermined set of spatial coordinates and also having a retroreflector mounted to the displacement body, the positioning mechanism being capable of measuring a measured value of the spatial coordinates of the retroreflector; a laser interferometer having a reference point and measuring a measured length value that is a distance from the reference point to the retroreflector; and a control device that is connected to the positioning mechanism and the laser interferometer. The control device includes a measurement controller that divides a plurality of measurement points into a plurality of measurement lines, displaces the displacement body to the plurality of measurement points, and acquires the measured length value and the measured value at each of the measurement points; and a correction value calculator that performs parameter calculation that calculates a correction parameter based on the measured value, the measured length value, and the coordinates of the reference point. The correction value calculator applies a first correction constant to the measured length value for each measurement line, and applies a second correction constant different from the first correction constant to the coordinates of the reference point for each measurement line to calculate the correction parameter. In the present invention, effects similar to those of the above-described inventions can be achieved, and even in a case where the offset of the reference point coordinates gradually increases during measurement due to a temperature drift, for example, by correcting the positional offset of the reference point coordinates and the measured length value for each measurement line, the incorporation of an error in the measured length value can be inhibited, and a highly accurate correction parameter can be calculated.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
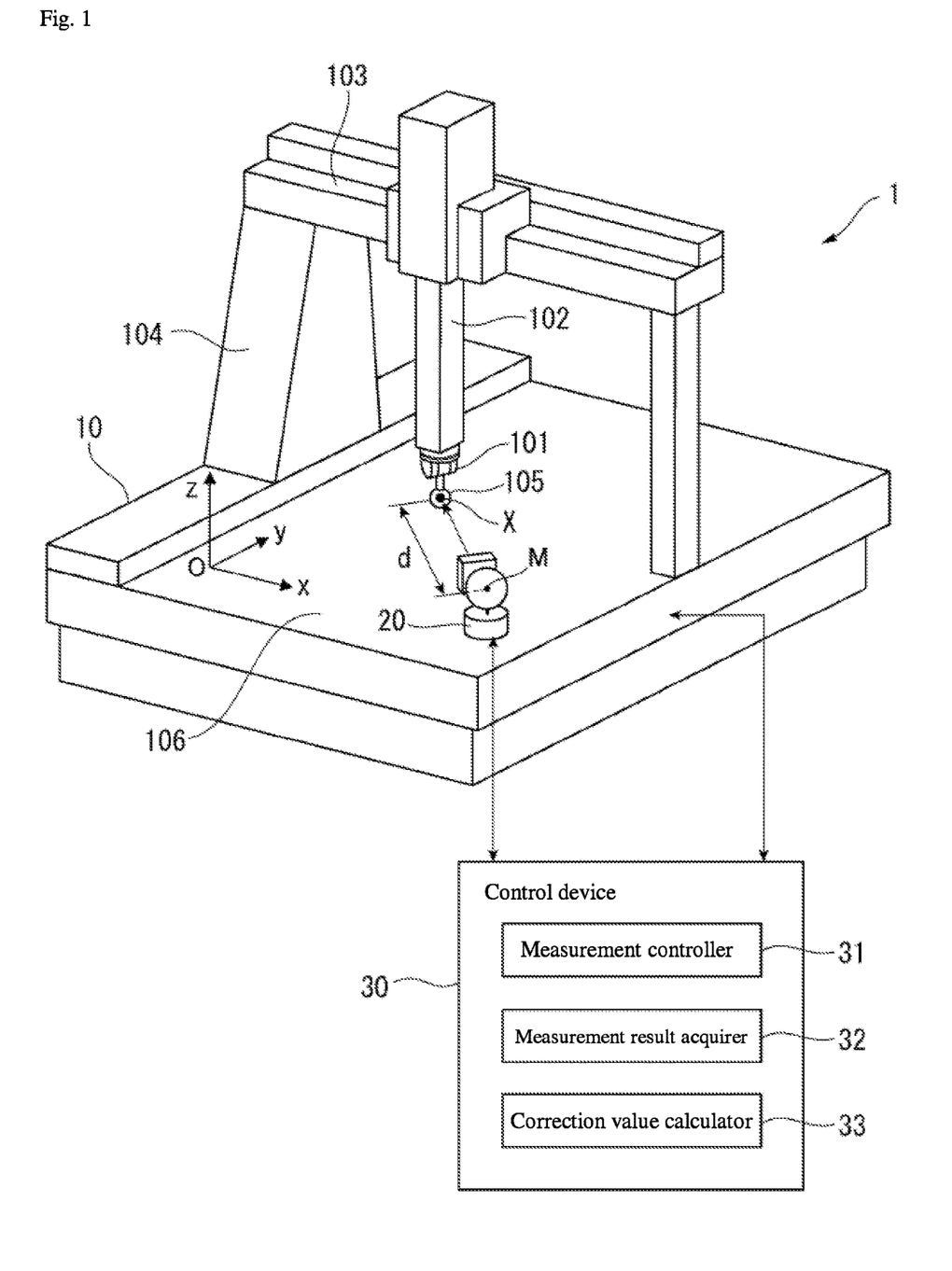
FIG. 1 illustrates a schematic configuration of a spatial accuracy correction apparatus according to an embodiment.

Hereafter, a spatial accuracy correction apparatus according to an embodiment of the present invention is described. FIG. 1 illustrates a schematic configuration of a spatial accuracy correction apparatus 1 according to the embodiment. The spatial accuracy correction apparatus 1 includes a CMM 10, a tracking-type laser interferometer 20, and a control device (controller) 30. In FIG. 1, the CMM 10 and the tracking-type laser interferometer 20 have the same configuration as the conventional example illustrated in FIG. 4. Specifically, the CMM 10 is equivalent to a positioning mechanism in the present invention, and includes a measurement probe 101, a Z spindle 102 to which the measurement probe 101 is affixed, an X guide 103 holding the Z spindle 102 so as to be capable of displacement in an X direction, and a column 104 to which the X guide 103 is affixed and which is capable of displacement in a Y direction. In addition, the CMM 10 includes a Y displacement mechanism, an X displacement mechanism, a Z displacement mechanism, and various scales, none of which are shown in the drawings. The CMM 10 also positions the measurement probe 101 (displacement body or displacer) by displacing the measurement probe 101 to a position having predetermined spatial coordinates, and measures the spatial coordinates of the positioned measurement probe 101 as a measured or measurable value $X_{CMM}$. In the present embodiment, by controlling the Y displacement mechanism, X displacement mechanism, and Z displacement mechanism, the measurement probe 101 and the Z spindle 102 to which the measurement probe 101 is affixed are displaced in XYZ directions, configuring the displacement body of the present invention. Moreover, a retroreflector 105 that reflects laser light from the tracking-type laser interferometer 20 is mounted at a tip position of the measurement probe 101 configuring the displacement body. The measurement probe 101 may also be detached and the retroreflector 105 mounted to a tip position of the Z spindle 102.

The tracking-type laser interferometer 20 is equivalent to a laser interferometer in the present invention, and is installed within a measurement range of the CMM 10 (a table 106 or the like on which a measured or measureable object is placed, for example) or in the vicinity thereof. Although not shown in the drawings, the tracking-type laser interferometer 20 includes, for example, a laser light source that emits laser light, a light separator that separates the laser light into measurement light and reference light, a light receiver receiving interfering light that is a composite of the reference light and laser light reflected by the retroreflector 105 (return light), and a two-axis rotation mechanism that controls an emission direction of the measurement light (laser light). In addition, the tracking-type laser interferometer 20 tracks the retroreflector 105 by controlling the two-axis rotation mechanism, such that an optical axis of the return light reflected by the retroreflector 105 coincides with an optical axis of the emitted light. More specifically, the two-axis rotation mechanism includes a horizontal rotation mechanism that rotates the emission direction of the laser centered around a perpendicular axis that is parallel to a Z axis and sweeps the emission direction of the laser in a horizontal direction, and a Z rotation mechanism that causes rotation centered around a horizontal axis that is orthogonal to the perpendicular axis and sweeps the emission direction of the laser in the Z direction. Also, a point of intersection between the perpendicular axis and the horizontal axis is a rotation center M of the tracking-type laser interferometer 20, and serves as a reference point in the present invention. The tracking-type laser interferometer 20 uses the interference between the reference light and the return light from the retroreflector 105 to measure a distance from the rotation center M of the two-axis rotation mechanism to the retroreflector 105. The distance measured by the tracking-type laser interferometer 20 is designated as a measured length value d.

The control device 30 is connected to both the CMM 10 and the tracking-type laser interferometer 20. Also, the control device 30 controls the CMM 10 and the tracking-type laser interferometer 20, acquires the measured value $X_{CMM}$ for the position of the retroreflector 105 from the CMM 10 and the measured length value d from the tracking-type laser interferometer 20, respectively, and performs a spatial accuracy correction process of the CMM 10.

Specifically, the control device 30 is configured by, e.g., a computer, and includes, for example, storage configured by a memory or the like and a calculator configured by a CPU (Central Processing Unit), computer processor or the like. Also, as shown in FIG. 1, the calculator retrieves and executes a program stored in the storage, and the controller 30 thereby carries out operations as a measurement controller 31, a measurement result acquirer 32, a correction value calculator 33, and the like.

The measurement controller 31 displaces the retroreflector 105 to a predetermined measurement point X. In the present embodiment, a plurality of measurement points at which measurement is conducted and a measurement order for the measurement points are defined ahead of time. In this example, in the present embodiment, the plurality of measurement points are divided into a plurality of measurement lines that include a predetermined number Ka of measurement points, and the measurement controller 31 measures each of the measurement points belonging to the measurement line in order, then measures the measurement points belonging to the next measurement line in order.

The measurement result acquirer 32 acquires the measurement results for each measurement point. In other words, the measurement result acquirer 32, for example, synchronizes the CMM 10 and the tracking-type laser interferometer 20, and causes the measured value $X_{CMM}$ and the measured length value d for the measurement point X to be measured simultaneously. The measurement probe 101 may also be stopped at the measurement point X by the measurement controller 31 and the measured value $X_{CMM}$ and the measured length value d may be measured at substantially the same time.

The correction value calculator 33 calculates a correction parameter Bα based on the measured value $X_{CMM}$ and the measured length value d acquired by the measurement result acquirer 32. Detailed processes of the measurement controller 31, the measurement result acquirer 32, and the correction value calculator 33 are described below.

Spatial Accuracy Correction Method

Hereafter, a spatial accuracy correction method (spatial accuracy correction process) performed by the spatial accuracy correction apparatus 1 is described in which a correction parameter for correcting the spatial coordinates of the CMM 10 is calculated. In the spatial accuracy correction process according to the present embodiment, the position of the rotation center M of the tracking-type laser interferometer 20 (installation position of the tracking-type laser interferometer 20) and a stylus offset (relative position of the retroreflector 105 with respect to the Z spindle) are modified and the measured values $X_{CMM}$ and measured length values d for the plurality of measurement points X are acquired, and the correction parameter Bα is calculated. In this example, the present embodiment is described as having a variable that indicates the stylus offset designated n (where n is an integer from 1 to $n_{max}$ and an initial value is n=1) and a variable that indicates the position of the rotation center M of the tracking-type laser interferometer 20 designated m (where m is an integer from 1 to $m_{max}$ and an initial value is m=1).

Figure 2:
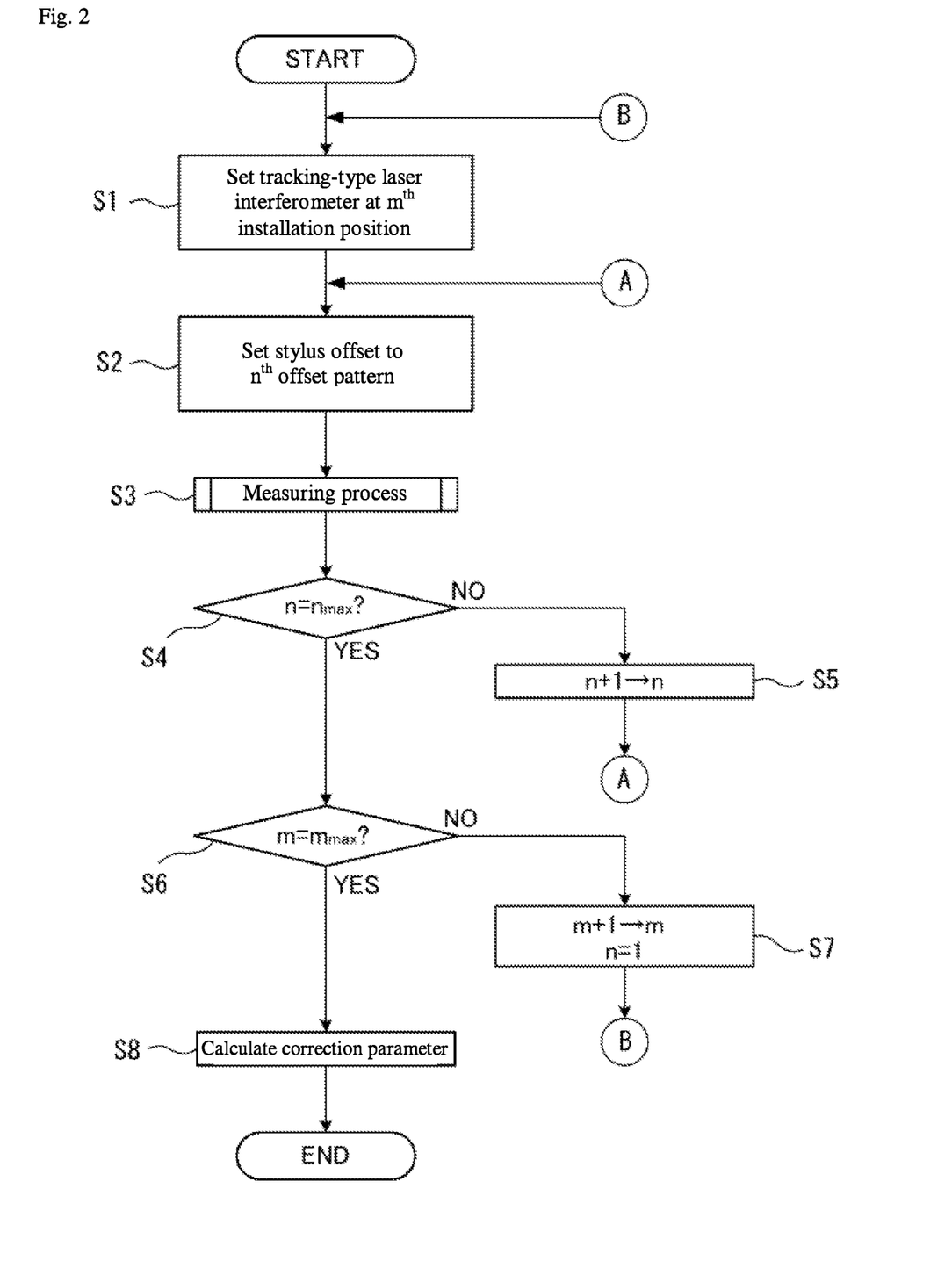
FIG. 2 is a flow chart illustrating a spatial accuracy correction method according to the embodiment.

FIG. 2 is a flow chart illustrating a spatial accuracy correction process (spatial accuracy correction method) according to the present embodiment. In the spatial accuracy correction process according to the present embodiment, first, the position of the rotation center M of the tracking-type laser interferometer 20 is set to an $m^{th}$ installation position (step S1). The stylus offset is set to a position of an $n^{th}$ offset pattern (step S2). In steps S1 and S2, an operator may, for example, manually modify the mount position of the retroreflector 105 and the installation position of the tracking-type laser interferometer 20, or the mount position of the retroreflector 105 and the installation position of the tracking-type laser interferometer 20 may be modified automatically. For example, a motorized probe that is capable of modifying an orientation of the stylus using electric drive may be used as the measurement probe 101, and the relative position of the retroreflector 105 with respect to the Z spindle 102 may be displaced through control executed by the control device 30. In addition, the tracking-type laser interferometer 20 may be held by a movable arm that is capable of displacing with respect to the XYZ directions, and the installation position of the tracking-type laser interferometer 20 may be set to a predetermined position by controlling the movable arm through control executed by the control device 30. After this, the control device 30 conducts a measurement process (measurement step) of the measured values $X_{CMM}$ and the measured length values d for the plurality of measurement points X (step S3).

Figure 3:
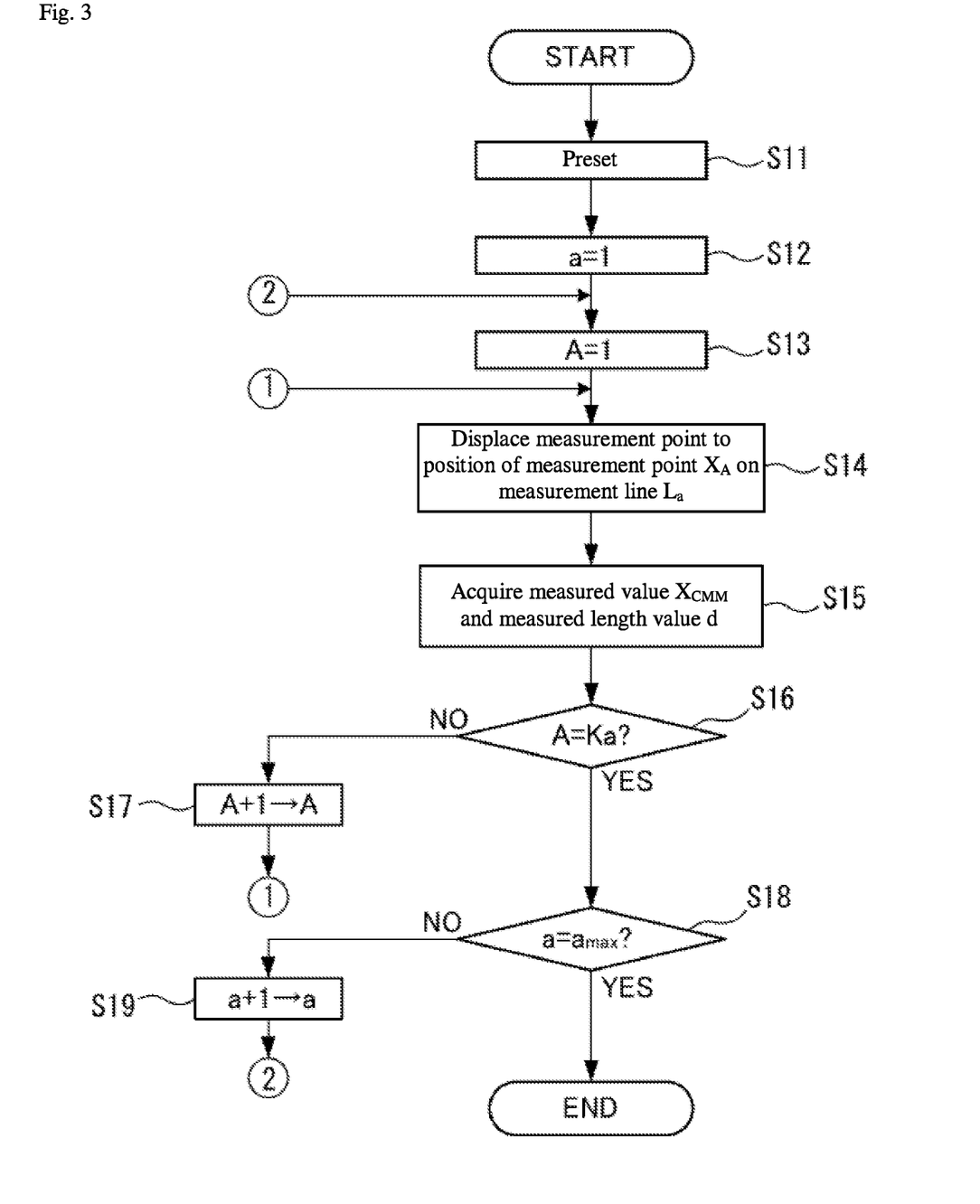
FIG. 3 is a flow chart illustrating a measuring process according to the embodiment.

FIG. 3 is a flow chart illustrating a process according to the present embodiment for measuring the measured values $X_{CMM}$ and the measured length values d for the plurality of measurement points X. In the measuring process of step S3, similar to a conventional spatial accuracy correction process, first presetting is performed in which the position of the rotation center M of the tracking-type laser interferometer 20 and an absolute distance from the rotation center M to the retroreflector 105 are defined (step S11). In step S11, as in the specification of German Patent No. 102007004934 and Umetsu et al. (2005), for example, a multilateration method is used to calculate the coordinates of the rotation center M and the absolute distance from the rotation center M to the retroreflector 105, and presetting is performed such that the measured length value d acquired by the tracking-type laser interferometer 20 equals the absolute distance from the rotation center M to the retroreflector 105.

Next, the control device 30 controls the CMM 10, displaces the retroreflector 105 to the plurality of measurement points X, and conducts a measurement with the CMM 10 and a length measurement with the tracking-type laser interferometer 20 for each of the measurement points X. For these measurements, the control device 30 first sets a variable a that indicates the measurement line to an initial value (a=1) (step S12), then sets a variable A that indicates the measurement point X belonging to each measurement line to an initial value (A=1) (step S13). The variable a is an integer from 1 to $a_{max}$, and "measurement line $L_a$" indicates an $a^{th}$ measurement line L. Furthermore, the variable A is an integer from 1 to Ka, and a measurement point $X_A$ indicates a measurement point X that is measured $A^{th}$ on the measurement line. The number Ka of measurement points X included in the measurement line L may be a different value for each measurement line L, or may be the same value for each.

Also, the measurement controller 31 controls the CMM 10 and displaces the retroreflector 105 to a measurement point $X_A$ on a measurement line $L_a$ (step S14). The measurement result acquirer 32 measures the measurement point $X_A$ on the measurement line $L_a$ with the CMM 10 and the tracking-type laser interferometer 20, and acquires the measured value $X_{CMM}$ measured by the CMM 10 and the measured length value d measured by the tracking-type laser interferometer 20, respectively (step S15). In step S15, the CMM 10 and the tracking-type laser interferometer 20 may be synchronized and the measured value $X_{CMM}$ and the measured length value d may be acquired simultaneously; the retroreflector 105 may also be stopped at a position corresponding to the measurement point $X_A$ and the measurement by the CMM 10 and the measurement by the tracking-type laser interferometer 20 may be carried out in order.

After this, the measurement controller 31 determines whether the variable A equals Ka (step S16). Specifically, the measurement controller 31 determines whether measurement for all (for Ka) of the measurement points X belonging to the measurement line $L_a$ has ended. When the measurement controller 31 reaches a "no" determination in step S16, 1 is added to the variable A (step S17) and the process returns to step S14. That is, measurement points X at Ka points from A=1 to A=Ka belonging to the measurement line $L_a$ are measured in succession.

Meanwhile, when the measurement controller 31 reaches a "yes" determination in step S16, the measurement controller 31 determines whether the variable a equals $a_{max}$ (step S18). When the measurement controller 31 reaches a "no" determination in step S18, 1 is added to the variable a (step S19) and the process returns to step S13. Accordingly, in the present embodiment, the measurement lines $L_a$ (from the measurement line $L_1$ to the measurement line $L_{amax}$) are measured in order, and in the measurement of each measurement line $L_a$, a number Ka of measurement points X belonging to the measurement line $L_a$ are measured in order, from measurement point $X_1$ to measurement point $X_{Ka}$.

Then, when the measurement controller 31 reaches a "yes" determination in step S18, and the measured values $X_{CMM}$ and measured length values d for all of the measurement points X in all of the measurement lines L have been measured, the measurement process for a case where the stylus offset is an $n^{th}$ offset pattern and the position of the rotation center M is an $m^{th}$ position is ended.

After this, the control device 30 determines whether the variable n equals $n_{max}$ (step S4), and when the control device 30 reaches a "no" determination, 1 is added to the variable n (step S5) and the process returns to step S2. Also, when the control device 30 reaches a "yes" determination in step S4, a determination is made as to whether the variable m equals $m_{max}$ (step S6), and when a "no" determination is made, 1 is added to the variable m and the variable n is set to the initial value of 1 (step S7) and the process returns to step S1.

Meanwhile, in step S6, when a "yes" determination is reached, the correction value calculator 33 uses the measured value $X_{CMM}$ and the measured length value d measured by the measuring process of step S3 and calculates the correction parameter Bα of the CMM 10 (step S8: parameter calculation step). In this example, in step S8, the correction value calculator 33 applies (adds) a first correction constant $F_{da}$ to the measured length value d for each measurement point X, and applies (adds) a second correction constant $F_{Ma}$ different from the first correction constant $F_{da}$ to the coordinates of the rotation center M to calculate the correction parameter Bα. In this example, the subscript "a" in the first correction constant $F_{da}$ and the second correction constant $F_{Ma}$ is the variable indicating the measurement line. In other words, in the present embodiment, the first correction constant $F_{da}$ and the second correction constant $F_{Ma}$ are respectively different constants for each measurement line. For example, with the measurement line $L_1$, a first correction constant $F_{d1}$ is applied to the measured length value d for each measurement point X, and a second correction constant $F_{M1}$ is applied to the rotation center M. Meanwhile, with a measurement line $L_2$, a first correction constant $F_{d2}$ is applied to the measured length value d for each measurement point X, and a second correction constant $F_{M2}$ is applied to the rotation center M.

The correction value calculator 33 substitutes the first correction constant $F_{da}$ and the second correction constant $F_{Ma}$ ($f_{xma}$, $f_{yma}$, $f_{zma}$) applied to each measurement line, the several thousand measured values $X_{CMM}$ ($x_{CMM}$, $y_{CMM}$, $z_{CMM}$) and measured length values d measured by the measuring process of step S3, and the coordinates ($x_m$, $y_m$, $z_m$) of the rotation center M measured in step S11 into Expression (1) as well as (3), which is given below, and simultaneous equations for several thousand Expressions (1) and (3) are generated, and the correction parameter Bα is calculated by solving the simultaneous equations using the least square method.

[Formula 2]

$$\delta p \equiv [\delta x \quad \delta y \quad \delta z]^T = HB\alpha \qquad (1)$$

$$\sqrt{\{(x_{CMM}+\delta x)-(x_m+f_{xma})\}^2 + \{(y_{CMM}+\delta y)-(y_m+f_{yma})\}^2 + \{(z_{CMM}+\delta z)-(z_m+f_{zma})\}^2} = \qquad (3)$$

$$(d+F_{da})$$

When Bα is a matrix of correction parameters for the CMM 10 expressed by a B-spline function, B is a matrix of basis functions of B-spline functions, and a is a matrix of coefficients for the basis functions. H is a matrix converting the correction parameter Bα to an error δp of the measured value $X_{CMM}$, and is a known matrix configured from a mechanical structure and stylus offset information for the CMM 10 to be corrected. Also, the left and right sides of Expression (3) express, respectively, the measured value $X_{CMM}$ for the CMM 10 and the distance from the rotation center M to the retroreflector 105, which is expressed by the measured length value d of the tracking-type laser interferometer 20.

The first correction constant $F_{da}$ and the second correction constant $F_{Ma}$ are both unknown quantities, and a different correction constant is applied each time the position of the rotation center M of the tracking-type laser interferometer 20 is changed, each time the stylus offset is changed, and also for each measurement line. These correction constants can be found, together with the correction parameter Bα, when solving the simultaneous equations of Expressions (1) and (3). At this time, the correction value calculator 33 also calculates an optimal solution for the first correction constant $F_{da}$ and the second correction constant $F_{Ma}$, simultaneously with the correction parameter Bα. In other words, an amount of offset of the position of the rotation center M generated during measurement at the measurement points X on each measurement line is calculated simultaneously with an error incorporated into the measured length value d due to the offset.

Advantages of Present Embodiment

In the present embodiment, for each measurement line $L_a$, the correction value calculator 33 applies the first correction constant $F_{da}$ to the measured length value d, and applies the second correction constant $F_{Ma}$ to the coordinates of the rotation center M to calculate the correction parameter Bα.

Accordingly, even when the position of the rotation center M of the tracking-type laser interferometer 20 becomes offset due to a temperature drift during measurement of the plurality of measurement points, and an error is incorporated into the measured length value d due to the offset, by correcting an amount of offset in the position of the rotation center M and the error included in the measured length value d for each measurement line $L_a$, the incorporation of such errors can be inhibited and a highly accurate correction parameter can be calculated.

Moreover, the correction value calculator 33 calculates the first correction constant $F_{da}$ and the second correction constant $F_{Ma}$, simultaneously with calculating the correction parameter Bα. Accordingly, during the measurement of each measurement line, the timing at which offset of the rotation center M occurs and the amount of that offset, as well as the error incorporated into the measured length value d, can be determined.

Modification

Moreover, the present invention is not limited to the above-described embodiment, and includes modifications not deviating from the scope of the present invention. For example, in the embodiment described above, the CMM 10 is given as an example of a positioning mechanism, but the present invention is not limited to this. As noted above, any mechanism that positions a displacement body by displacing the displacement body to a predetermined set of spatial coordinates can be employed as the positioning mechanism. For example, the positioning mechanism may be a machine tool having a processing tool that cuts, polishes, or performs similar work on an object as the displacement body, where the machine tool displaces the processing tool to a predetermined coordinate position. The positioning mechanism may also be a transport robot having a gripping arm that grips an object as the displacement body, where the transport robot transports the gripped object to a predetermined position.

In the embodiment described above, the plurality of measurement points X are divided into a plurality of measurement lines $L_a$, and in each measurement line $L_a$, the first correction constant $F_{da}$ applied to the measured length value d and the second correction constant $F_{Ma}$ applied to the rotation center M are defined as different constants for each measurement line $L_a$. However, the present invention is not limited to this. For example, after the presetting in step S11, when correcting a change in position of only the rotation center M that has occurred in a period before measurement of each of the measurement points is begun, the first correction constants $F_{da}$ applied to each of the totality of measurement lines $L_a$ may be identical, and the second correction constants $F_{Ma}$ applied to the rotation center M may also be identical.

In the embodiment described above, an example is given in which the number of measurement points X (number Ka of measurement points) belonging to the measurement line $L_a$ is a different value for each measurement line $L_a$, but the number of measurement points X belonging to each measurement line $L_a$ may be an identical number Ka of measurement points.

A method of defining the measurement points X belonging to the measurement line $L_a$ in the embodiment described above may be any method. For example, measurement points having a distance that is within a predetermined value from a preset reference measurement point may be included in a single measurement line $L_a$. In other words, the measurement points X that are positioned near to each other may be included in the same measurement line $L_a$. Also, when the plurality of measurement points are measured in succession, the measurement lines $L_a$ may be divided at the measurement points that can be measured within a predetermined amount of time. Specifically, the plurality of measurement points X that are measured within a predetermined first time t from the beginning of the measurement are the measurement points X belonging to the measurement line $L_1$, and the measurement points X that are measured within a second time 2t from the first time t are the measurement points X belonging to the measurement line $L_2$. Also, in such a case, time intervals for the measurement lines $L_a$ are not necessarily constant. For example, the measurement points X that are measured within a first time $t_1$ from the beginning of the measurement may be designated as the measurement points X belonging to the measurement line $L_1$, and the measurement points X that are measured from the first time $t_1$ up to a second time $t_2$ ($t_1 \neq t_2 - t_1$) may be designated as the measurement points X belonging to the measurement line $L_2$.

In the embodiment described above, the tracking-type laser interferometer 20 having the rotation center M as the reference point is given as an example of a laser interferometer, but the present invention may also employ a laser interferometer that does not have a tracking function. However, each time a measurement point X is displaced, the length measurement direction for measuring the distance with the laser interferometer must be modified. Accordingly, in such a case, preferably, a plurality of measurement points are defined on the length measurement direction of the laser interferometer (on a straight line), and once the retroreflector 105 has been displaced to each measurement point the measured value $X_{CMM}$ and the measured length value d are measured. In addition, the length measurement direction is preferably changed to a plurality of directions, and the plurality of measurement points X are preferably defined for each length measurement direction.

In the embodiment described above, an example is given where the first correction constant $F_{da}$ is applied to the measured length value d and the second correction constant $F_{Ma}$ is applied to the rotation center M. However, a correction constant may also be applied to only one of the measured length value d and the rotation center M. For example, when a correction constant is applied to only the measured length value d, in Expression (3) given above, simultaneous equations may be created with $f_{xma}$, $f_{yma}$, and $f_{zma}$ set to 0 to find the correction parameter Bα.

The present disclosure can be used for spatial accuracy correction of a positioning mechanism or machine, such as a coordinate measuring machine (CMM), machine tool, robot, or the like that positions a displacement body by displacing the displacement body to a predetermined coordinate position.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A spatial accuracy correction method having a positioning mechanism displacing a displacement body to a predetermined set of spatial coordinates, the positioning mechanism also having a retroreflector mounted to the displacement body, and a laser interferometer having a reference point and measuring a distance from the reference point to the retroreflector, the method performing spatial accuracy correction of the positioning mechanism using a measured length value measured by the laser interferometer and a measured value for spatial coordinates of the retroreflector measured by the positioning mechanism, the method comprising:

dividing a plurality of measurement points into a plurality of measurement lines, displacing the displacement body to the plurality of measurement points, and acquiring the measured length value and the measured value at each of the measurement points for each measurement line; and calculating a correction parameter based on the measured value, the measured length value, and the coordinates of the reference point, the calculating the calculating of the parameter comprising:

applying a first correction constant to the measured length value for each measurement line; and applying a second correction constant different from the first correction constant to the coordinates of the reference point for each measurement line.

2. A spatial accuracy correction apparatus comprising:

a positioning machine that displaces a displacer to a predetermined set of spatial coordinates, the positioning machine comprising a retroreflector mounted to the displacer, the positioning machine being configured to measure a measurable value of the spatial coordinates of the retroreflector;

a laser interferometer having a reference point and configured to measure a measurable length value that is a distance from the reference point to the retroreflector; and a controller operably connected to the positioning machine and the laser interferometer, the controller comprising a processor and a memory that stores an instruction, the processor further comprising, as a configuration when the processor executes the instruction stored in the memory:

a measurement controller that divides a plurality of measurement points into a plurality of measurement lines, displaces the displacer to the plurality of measurement points, and acquires the measured length value and the measured value at each of the measurement points; and a correction value calculator that performs parameter calculation that calculates a correction parameter based on the measured value, the measured length value, and the coordinates of the reference point, wherein the correction value calculator applies a first correction constant to the measured length value for each measurement line, and applies a second correction constant different from the first correction constant to the coordinates of the reference point for each measurement line to calculate the correction parameter.

* * * * *

UNITED STATES PATENT AND TRADEMARK OFFICE
CERTIFICATE OF CORRECTION

| | |
|---|---|
| PATENT NO. | : 11,366,448 B2 |
| APPLICATION NO. | : 16/219033 |
| DATED | : June 21, 2022 |
| INVENTOR(S) | : S. Yanaka et al. |

It is certified that error appears in the above-identified patent and that said Letters Patent is hereby corrected as shown below:

In the Claims

At Column 14, Line 9 (Claim 1, Line 21), please change "the calculating the calculating" to -- the calculating --.

Signed and Sealed this
Twenty-ninth Day of November, 2022

Katherine Kelly Vidal
*Director of the United States Patent and Trademark Office*